United States Patent
Walsh et al.

(10) Patent No.: US 8,135,800 B1
(45) Date of Patent: Mar. 13, 2012

(54) SYSTEM AND METHOD FOR USER CLASSIFICATION BASED ON SOCIAL NETWORK AWARE CONTENT ANALYSIS

(75) Inventors: Richard Walsh, Raleigh, NC (US);
Christopher Amidon, Apex, NC (US);
Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 525 days.

(21) Appl. No.: 11/645,864

(22) Filed: Dec. 27, 2006

(51) Int. Cl.
G06F 15/16 (2006.01)
G06F 17/30 (2006.01)

(52) U.S. Cl. ................................ 709/217; 707/723

(58) Field of Classification Search .............. 709/217, 709/201; 707/723
See application file for complete search history.

(56) References Cited

U.S. PATENT DOCUMENTS

| | | |
|---|---|---|
| 5,717,923 A | 2/1998 | Dedrick |
| 5,749,081 A | 5/1998 | Whiteis |
| 5,754,939 A | 5/1998 | Herz et al. |
| 5,867,799 A | 2/1999 | Lang et al. |
| 5,983,214 A | 11/1999 | Lang et al. |
| 6,092,049 A | 7/2000 | Chislenko et al. |
| 6,151,624 A | 11/2000 | Teare et al. |
| 6,167,441 A | 12/2000 | Himmel |
| 6,182,808 B1 | 2/2001 | Walton et al. |
| 6,195,696 B1 | 2/2001 | Baber et al. |
| 6,275,819 B1 | 8/2001 | Carter |
| 6,308,175 B1 | 10/2001 | Lang et al. |
| 6,311,194 B1 | 10/2001 | Sheth et al. |
| 6,327,590 B1 | 12/2001 | Chidlovskii et al. |
| 6,356,879 B2 | 3/2002 | Aggarwal et al. |
| 6,374,290 B1 | 4/2002 | Scharber et al. |
| 6,385,619 B1 | 5/2002 | Eichstaedt et al. |
| 6,389,409 B1 | 5/2002 | Horovitz et al. |
| 6,438,579 B1 | 8/2002 | Hosken |

(Continued)

FOREIGN PATENT DOCUMENTS

EP 1177056 7/2001

(Continued)

OTHER PUBLICATIONS

Deborah L. McGuinness et al., "OWL Web Ontology Language—Overview", (article), Feb. 10, 2004, 19 pages, copyright 2004 World Wide Web Consortium (W3C), http://www.w3.org/TR/2004/REC-owl-features-20040210/.

(Continued)

*Primary Examiner* — Phuoc Nguyen
*Assistant Examiner* — Kishin G Belani
(74) *Attorney, Agent, or Firm* — Withrow & Terranova, PLLC

(57) ABSTRACT

A target user's profile may be generated based on scanning metadata related to various content items made available for sharing by the user. For instance, some content items may be made available for sharing by the target user while other items are made available for sharing by one or more other users in the target user's social network. A list of keywords related to each item may be generated from the metadata. Each keyword may then be scored using social network data. For example, social network data corresponding to one or more users associated with each content item may be used to score keywords related to that item. Scoring may be based on factors such as social network distance, relationship type, trust, length of time in the social network, amount of content, amount of metadata, and other factors.

24 Claims, 3 Drawing Sheets

U.S. PATENT DOCUMENTS

| | | |
|---|---|---|
| 6,457,010 B1 | 9/2002 | Eldering et al. |
| 6,463,433 B1 | 10/2002 | Baclawski |
| 6,493,703 B1 | 12/2002 | Knight et al. |
| 6,498,795 B1 | 12/2002 | Zhang et al. |
| 6,526,411 B1 | 2/2003 | Ward |
| 6,539,375 B2 | 3/2003 | Kawasaki |
| 6,553,367 B2 | 4/2003 | Horovitz et al. |
| 6,560,578 B2 | 5/2003 | Eldering |
| 6,581,072 B1 | 6/2003 | Mathur et al. |
| 6,606,644 B1 | 8/2003 | Ford et al. |
| 6,610,105 B1 | 8/2003 | Martin, Jr. et al. |
| 6,629,100 B2 | 9/2003 | Morris et al. |
| 6,654,735 B1 | 11/2003 | Eichstaedt et al. |
| 6,701,362 B1 | 3/2004 | Subramonian et al. |
| 6,725,259 B1 | 4/2004 | Bharat |
| 6,738,764 B2 | 5/2004 | Mao et al. |
| 6,745,178 B1 | 6/2004 | Emens et al. |
| 6,772,160 B2 | 8/2004 | Cho et al. |
| 6,839,680 B1 | 1/2005 | Liu |
| 6,859,807 B1 | 2/2005 | Knight et al. |
| 6,917,944 B1 | 7/2005 | Prasad et al. |
| 6,970,840 B1 | 11/2005 | Yu et al. |
| 6,980,993 B2 | 12/2005 | Horovitz et al. |
| 7,039,639 B2 | 5/2006 | Brezin et al. |
| 7,054,900 B1 | 5/2006 | Goldston |
| 7,117,254 B2 | 10/2006 | Lunt et al. |
| 7,150,030 B1 | 12/2006 | Eldering et al. |
| 7,302,429 B1 | 11/2007 | Wanker |
| 7,359,894 B1 | 4/2008 | Liebman et al. |
| 7,689,556 B2 | 3/2010 | Garg et al. |
| 7,693,901 B2 * | 4/2010 | Ka et al. ............ 707/723 |
| 7,698,301 B2 | 4/2010 | Lourdeaux |
| 7,720,916 B2 | 5/2010 | Fisher et al. |
| 2002/0052885 A1 | 5/2002 | Levy |
| 2002/0116466 A1 | 8/2002 | Trevithick et al. |
| 2002/0124053 A1 | 9/2002 | Adams et al. |
| 2003/0050977 A1 | 3/2003 | Puthenkulam et al. |
| 2003/0078858 A1 | 4/2003 | Angelopoulos et al. |
| 2003/0101449 A1 | 5/2003 | Bentolila et al. |
| 2003/0110056 A1 | 6/2003 | Berghofer et al. |
| 2003/0120662 A1 | 6/2003 | Vishik |
| 2003/0163597 A1 | 8/2003 | Hellman et al. |
| 2003/0167324 A1 | 9/2003 | Farnham et al. |
| 2003/0179228 A1 | 9/2003 | Schreiber et al. |
| 2003/0191814 A1 | 10/2003 | Tran |
| 2003/0200190 A1 | 10/2003 | Adar et al. |
| 2003/0204605 A1 | 10/2003 | Hudson et al. |
| 2003/0212680 A1 | 11/2003 | Bates et al. |
| 2004/0019846 A1 | 1/2004 | Castellani et al. |
| 2004/0024719 A1 | 2/2004 | Adar et al. |
| 2004/0024720 A1 | 2/2004 | Fairweather |
| 2004/0032393 A1 | 2/2004 | Brandenberg et al. |
| 2004/0059705 A1 | 3/2004 | Wittke et al. |
| 2004/0215793 A1 | 10/2004 | Ryan et al. |
| 2004/0220893 A1 | 11/2004 | Spivack et al. |
| 2004/0267625 A1 | 12/2004 | Feng et al. |
| 2005/0034107 A1 | 2/2005 | Kendall et al. |
| 2005/0076365 A1 | 4/2005 | Popov et al. |
| 2005/0091289 A1 | 4/2005 | Shappell et al. |
| 2005/0097170 A1 | 5/2005 | Zhu et al. |
| 2005/0131762 A1 | 6/2005 | Bharat et al. |
| 2005/0154701 A1 | 7/2005 | Paranak et al. |
| 2005/0159970 A1 | 7/2005 | Buyukkokten et al. |
| 2005/0171954 A1 | 8/2005 | Hull et al. |
| 2005/0171995 A1 | 8/2005 | Grindahl et al. |
| 2005/0177385 A1 | 8/2005 | Hull et al. |
| 2005/0209999 A1 | 9/2005 | Jou |
| 2005/0210387 A1 | 9/2005 | Alagappan et al. |
| 2005/0210409 A1 | 9/2005 | Jou |
| 2005/0226511 A1 | 10/2005 | Short |
| 2005/0232423 A1 | 10/2005 | Horvitz et al. |
| 2005/0246420 A1 | 11/2005 | Little, II |
| 2005/0256756 A1 * | 11/2005 | Lam et al. ............ 705/10 |
| 2005/0256866 A1 | 11/2005 | Lu et al. |
| 2005/0267766 A1 | 12/2005 | Galbreath et al. |
| 2006/0042483 A1 | 3/2006 | Work et al. |
| 2006/0047635 A1 | 3/2006 | Kraenzel et al. |
| 2006/0064411 A1 | 3/2006 | Gross et al. |
| 2006/0064431 A1 | 3/2006 | Kishore et al. |
| 2006/0085248 A1 | 4/2006 | Arnett et al. |
| 2006/0085818 A1 | 4/2006 | Bodlaender et al. |
| 2006/0112111 A1 | 5/2006 | Tseng et al. |
| 2006/0121987 A1 | 6/2006 | Bortnik et al. |
| 2006/0143067 A1 | 6/2006 | Calabria |
| 2006/0143236 A1 | 6/2006 | Wu |
| 2006/0161553 A1 | 7/2006 | Woo |
| 2006/0173838 A1 | 8/2006 | Garg et al. |
| 2006/0173957 A1 | 8/2006 | Robinson et al. |
| 2006/0173985 A1 | 8/2006 | Moore |
| 2006/0184464 A1 | 8/2006 | Tseng et al. |
| 2006/0190524 A1 | 8/2006 | Bethke et al. |
| 2006/0195441 A1 | 8/2006 | Julia et al. |
| 2006/0200435 A1 | 9/2006 | Flinn et al. |
| 2006/0218153 A1 | 9/2006 | Voon et al. |
| 2006/0218225 A1 * | 9/2006 | Hee Voon et al. ............ 709/201 |
| 2006/0242581 A1 | 10/2006 | Manion et al. |
| 2006/0248458 A1 | 11/2006 | Li |
| 2006/0248573 A1 * | 11/2006 | Pannu et al. ............ 726/1 |
| 2007/0106627 A1 * | 5/2007 | Srivastava et al. ............ 706/20 |
| 2007/0179945 A1 | 8/2007 | Marston et al. |
| 2007/0244861 A1 * | 10/2007 | Malandain et al. ............ 707/3 |
| 2008/0040428 A1 * | 2/2008 | Wei et al. ............ 709/204 |

FOREIGN PATENT DOCUMENTS

| | | |
|---|---|---|
| EP | 1675060 | 6/2006 |
| WO | WO 2006036165 | 4/2006 |
| WO | WO 2006041425 | 4/2006 |

OTHER PUBLICATIONS

Alexander Pretschner et al., "Ontology Based Personalized Search," (article), Nov. 8-10, 1999, p. 391, Proceedings of the 11th IEEE International Conference on Tools with Artificial Intelligence.

T. Srinivasan et al., "OPSHNN: Ontology Based Personalized Searching Using Hierarchical Neural Networks Evidence Combination," (article), Sep. 2006, p. 44, The Sixth IEEE International Conference on Computer and Information Technology 2006.

Amidon et al., U.S. Appl. No. 11/526,955, filed Sep. 26, 2006, "Systems and Methods for Discovering, Creating, Using and Managing Social Network Circuits".

Walsh et al., U.S. Appl. No. 11/636,910, filed Dec. 11, 2006, "System and Method for Social Network Trust Assessment".

Walsh et al., U.S. Appl. No. 11/645,854, filed Dec. 27, 2006, "System and Method for Classification of Communication Sessions in a Social Network".

Home page for www.myspace.com (accessed Jul. 13, 2007)—1 page.

Home page for www.facebook.com (accessed Jul. 13, 2007)—1 page.

Homepage for www.friendster.com (accessed Jul. 13, 2007)—1 page.

Definition of Centrality as per Wikipedia (accessed Sep. 13, 2007).

Definition of Eigenvector Centrality as per Wikipedia (accessed Sep. 13, 2007).

"The Mathematics of Networks" by M.E.J. Neman, in *The New Palgrave Encyclopedia of Economics*, 2nd edition.

* cited by examiner

SYSTEM AND METHOD FOR USER CLASSIFICATION BASED ON SOCIAL NETWORK AWARE CONTENT ANALYSIS

FIELD OF THE INVENTION

The present invention relates generally to automatic classification of users in computer-based communication networks based on data including metadata of content made available for sharing by such users.

BACKGROUND OF THE INVENTION

The increased availability of network-capable computing devices has led to a wide variety of communication options for users. Users can exchange messages and content through various communication systems including e-mail, instant messaging, chat rooms, bulletin and discussion boards, file sharing applications, and blogs and other web sites. For example, instant messaging systems such as Internet Relay Chat (IRC), ICQ, AOL Instant Messenger, Yahoo! Messenger, and Microsoft's MSN Messenger are widely used by many users on the Internet. Similar systems are available for messaging within local networks, as well.

Various arrangements of the previously-listed (and other) communication systems have been proposed for use in so-called "social networking" systems. Generally speaking, a "social network" refers to a group of persons or other entities ("members") linked to one another through one or more types of social connections. Social networks are also commonly referred to as "friend-of-a-friend" networks, although social networks may of course include or consist entirely of entities linked by social connections other than friendship. For example, a social network can include members linked to one another by connections including common friendship, place or field of employment, place of education, place of residence, membership in a club or other group, or common hobbies or topical interests. Many social networking systems attempt to provide computer-based tools for maintaining, enhancing, and creating social networks.

For example, social networking web sites provide users with web space to create a profile and link to various other users designated as "friends." See, for example, http://www.myspace.com, http://www.facebook.com, and http://www.friendster.com. Users of such sites can post messages and other content to web pages accessible to various parties of their choosing (for example, to "friends only" or to the public at large). Social networking sites may also utilize instant messaging and online chat rooms that allow for near-instantaneous communication between users. Social networks may also involve sharing of digital content, including photos, videos, audio files, documents, and other data items.

Social networks and other computer-based communication systems may provide various means for users to set up profiles. For example, a user may list interests and other attributes in a profile, with the profile used by other users for informational purposes and/or by one or more computer systems to provide functionality, such as recommendations and/or content delivery, for instance. However, users may provide inaccurate and/or incomplete profile information.

Various systems have been proposed to profile users based on tracking user activity (such as web page or other content viewing habits), but such tracking may take an inordinate amount of time to fully develop a profile of a user.

Therefore, in light of the foregoing and other concerns, improved methods and systems for classifying users in computer networks remain desirable.

SUMMARY

Objects and advantages of the present invention will be apparent to one of skill in the art upon careful review of this disclosure, and include providing improved methods and systems of classifying users in computer networks.

In embodiments discussed in detail below, rather than relying solely upon a target user to provide data for use in a profile, a profile is generated based on various items of content. For purposes of this disclosure, a "target user" is a user that is participating in one or more social networks and for which one or more profiles are generated. Although examples herein refer to single natural persons, a target user and/or other users in a social network may represent groups of individuals, organizations, or other entities.

Content metadata related to items associated with members of the target user's social network can be scanned in order to generate a list of keywords. Each keyword may be scored by various factors. For instance, keywords may be derived from one or more content items made available for sharing by one or more users in the target user's social network. Such keywords may be scored based in part on the relationship between the target user and the one or more users sharing the content item(s), with the relationship determined from social network data. Additionally, other social network information regarding the users who share the content items may be used to score keywords derived from those items. Scoring may also be based on other data regarding the users who share the content items and/or the target user. Additionally or alternatively, scoring may be based on other factors such as normalizing any particular user and/or content item's contribution to the target user's profile, as well as user preferences and system-level rules.

The present disclosure refers to accessing data related to content items that have been "shared." It is intended that the use of the terms "sharing, shared," and so forth refer to content that has been "made available for sharing," and use of terms such as "sharing" or "shared" is not meant to exclude consideration of content that has not yet been downloaded, viewed, or otherwise shared-in-fact.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Figure 1:
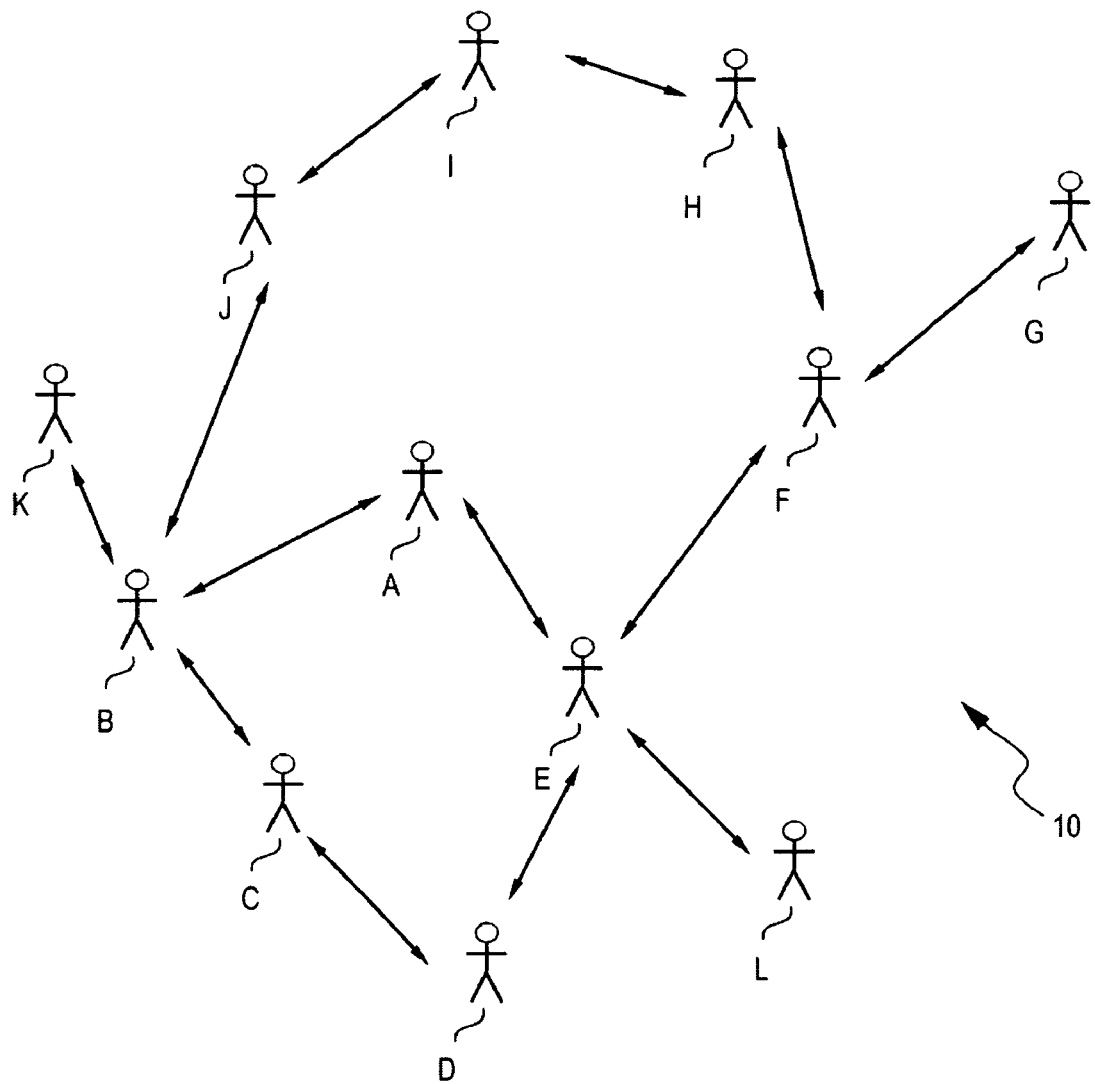
FIG. 1 is a diagram illustrating an exemplary social network.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The present disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computing device, cause the at least one computing device to provide social network user classification functionality. Any suitable computing device or combination(s) of devices may be used, including, but not limited to, servers, desktop computers, laptop computers, and other devices regardless of architecture or operating system.

Furthermore, components of the presently-disclosed technology, such as knowledge bases and data stores, may be implemented using one or more computer-readable media. Any suitable computer-readable medium or media may be used to implement and/or utilize the presently disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure provides several examples of classifying users based on certain types of shared content and certain types of metadata, such as keywords. However, in other embodiments, any suitable type of metadata may be used, and any suitable type of content may be used in classifying users. Furthermore, the extent of the illustrated social networks, relationship types, and other social network characterizations are only for purposes of example; the present subject matter may utilize other types of social networks and social network data than illustrated herein.

Generally speaking, one or more computing devices can access and execute program instructions stored in one or more computer-readable media. The program instructions, when executed, cause the one or more computing devices to provide user classification functionality.

For example, for a particular target user, a plurality of users in the target user's social network may be selected. For each selected user, metadata related to one or more content items made available for sharing by the user may be accessed. Using the metadata, one or more keywords may be generated. For any particular content item, a single keyword or multiple keywords may be generated, depending on the item. It will be appreciated that, for some items, no keywords at all may be generated. Next, social network data associated with the selected user is accessed. For example, the social network data may indicate the selected user's position and/or other participation in one or more social networks. The social network data may reflect one or more relationships between the selected user and other users, such as the target user. Based at least in part on the social network data, each keyword derived from content made available for sharing by the selected user is scored. The scored keywords for each of the selected users are assembled into a list that is included in a profile for the target user.

For example, accessing metadata related to at least one content item can include interfacing with one or more content sharing servers or other computers associated with one or more content sharing systems and obtaining content metadata and/or content sharing system metadata regarding shared content items. Content items may be used in classifying the target user regardless of source or location of the actual items or metadata. For instance, members in the target user's social network may maintain one or more data stores containing content items. The data stores may comprise folders or other indicators that content is available for sharing. Content items located in a member's data store may be associated with that respective member based on the location of the item and/or by other data, such as content sharing system metadata, distribution histories, and/or data included with the content items.

Accessing social network data may include interfacing with one or more servers or other computers associated with one or more social network systems to obtain social network data regarding the selected user.

Some or all of a particular member's content items may be used in profiling other users. For example, in some embodiments, a target user is profiled based on items the target user can access from other users. In such embodiments, keywords derived from items that are not shared with the target user are given a reduced role in the profile or are not included at all.

Alternatively or additionally, some content items used in the determination may be stored locally to the target user or in one or more remote media associated with the target user (e.g. the target user's web space, for instance). For example, the target user may be treated as a selected user such that the target user's profile is based on his or her own shared content. In some embodiments, for content stored by the target user but received from another user, the classification process can determine which other user (or users) the content is associated with. For example, content sharing system metadata, such as file sharing histories, may be used to determine where and how the target user obtained various content items shared by other users.

Keywords may be scored in any suitable manner. In some embodiments, a keyword is scored based on one or more social network factors describing the relationship between the target user and the user who shared the content item that gave rise to the keyword. Social network factors may include, but are not limited to, social network distance (including degree of separation, levels, and the like), relationship type designator(s), level of trust, relationship strength, location of the target and/or selected user, and other factors. Additionally, scoring may be based on participation factors related to the user who shared the content item that gave rise to the keyword, but not related to any specific relationships. Participation factors can include, for example, the length of time the selected user has been a member of the social network and the selected user's centrality or other role in the network.

Additionally, scoring may be based on other factors, including the relative contribution of particular users and/or particular content items to a target user's profile. To prevent skewing by particular users and/or content items, keyword scores may be normalized as part of the scoring process.

Scoring may be further influenced by preferences, rules, and other parameters specified by various users of the classification system. For example, a target user may provide settings that specify weights to be given to certain users, types of content, or social network factors. A target user may further specify limits to the calculation, such as the number of other users to be considered, and or inclusion/exclusion rules for use in the selection of such other users.

A user of the classification system may specify further parameters for situations in which the user is a selected user (i.e. when content made available for sharing by the user is being used to profile another target user). For example, in some embodiments, a user may provide a points allocation profile that is used to normalize the user's contribution to another user's profile. For instance, a user may be provided a set number of points to be spread amongst different content items. The points allocation profile is considered at least in part when the user's contribution is being normalized as part of scoring keywords for another user's profile.

In some embodiments, keyword generation from metadata related to a content item may be based on the target user's access rights to the item. For instance, the profile generation process may include determining, for each content item associated with each selected user, the target user's access rights to the item. Keyword generation may then be based at least in part on the access rights—for instance, if several versions of a content item exist, keywords can be generated based on the version(s) the target user can access. In some embodiments, no keywords are generated for any content items which the target user cannot access.

In some embodiments, metadata access and/or keyword generation may be based on one or more access parameters.

For instance, users may provide privacy settings that designate content items as off-limits to the system. In some embodiments, the system first determines whether an item can be accessed before scanning metadata and/or generating keywords based on such access parameters.

FIG. 1 illustrates an exemplary social network 10 comprising users A, B, C, D, E, F, G, H, I, J, K, and L. Social network 10 may represent any number of relationships between and amongst the users as represented in data from one or more computer systems. For example, social network 10 may be a network of friends, colleagues, family, and acquaintances participating in a social networking system. Social network 10 may represent the end-result of cross-referencing contact lists, communication history and patterns, such as sharing of digital content, or other data representing interactions amongst the users.

Furthermore, social network 10 may be the result of combining multiple social networks. As an example, some portions of social network 10 may be derived from data maintained by a first social network service, while other portions may be derived from other data, such as data from a second social network service and/or other source(s) such as are listed above. In some of the examples discussed below, social network 10 comprises participants in a combined system providing social network and peer-to-peer (P2P) content sharing functionality. The principles of the present subject matter, however, are applicable regardless of the social network(s) that are utilized in support of classifying users.

Figure 2:
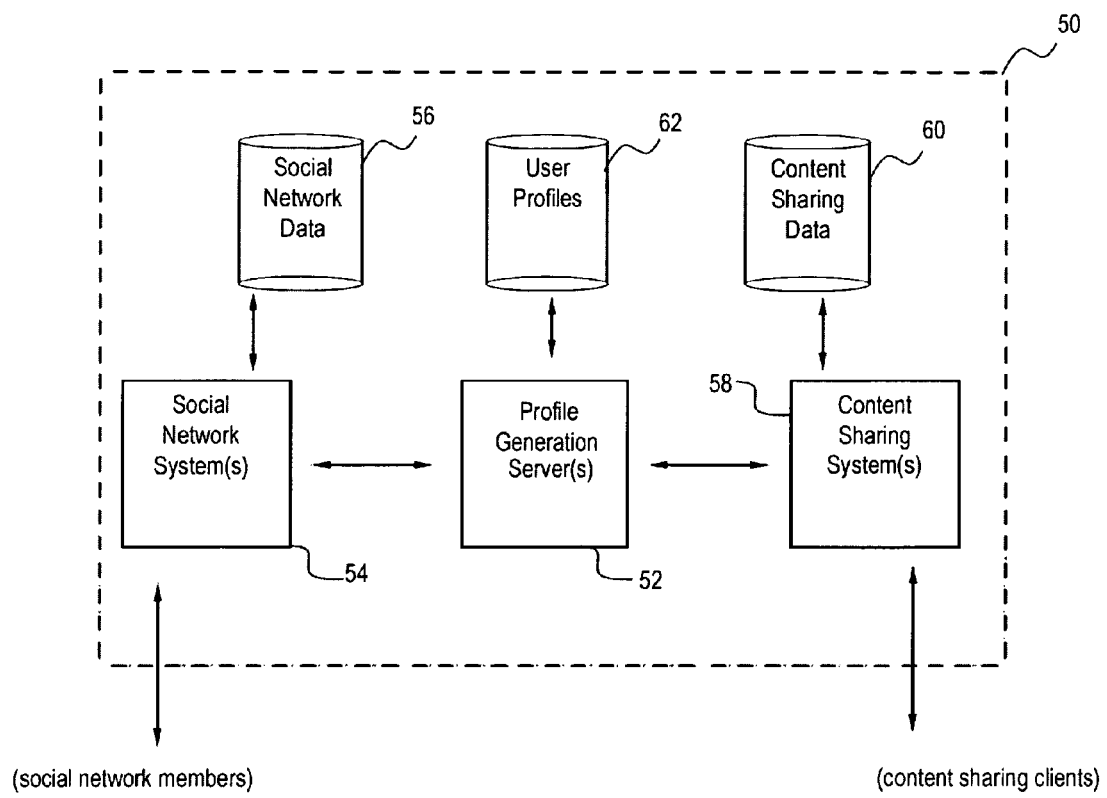
FIG. 2 is a block diagram illustrating components in an exemplary user classification system.

FIG. 2 is a functional block diagram of components in an exemplary system that provides user classification functionality. In this example, user classification system 50 comprises one or more profile generation servers, referred to herein for ease of reference as server 52. Any suitable number of physical and/or logical units may be used for server 52. Server 52 provides user classification functionality by generating one or more profiles for a target user based on data including content metadata for content made available for sharing by users in the target user's social network. Such users may include users other than the target user; however, in some embodiments, the target user (himself a participant in the social network) may be the user associated with some of the content metadata used in generating the profile. Profile generation server 52 accesses store 62, which comprises any suitable arrangement of storage components, such as one or more databases maintained in a computer-readable medium. Store 62 includes data defining one or more profiles of social network users. As will be discussed below, such profiles include, for each user, a list of scored keywords derived from content metadata, social network relationships, and other data.

Profile generation server 52 is in communication with one or more social network systems 54 and one or more content sharing systems 58. Social network system 54 may include one or more systems providing social network functionality. For example, a social network system may include a plurality of servers, databases, and other components that allow users to define profiles, characterize relationships, and interact with one another (such as via instant messaging, web pages, blog posts, etc.). Data representing the social network structures, member relationships, and other data defining the social network is maintained by store 56. Each social network system 54 may be implemented in a number of different ways, and so store 56 is meant to generally represent the various databases, mappings, and/or other representations of social networks.

Social network system 54 may represent any suitable type of system providing social network functionality. The underlying social networks may be static in nature, such as friend-of-a-friend networks, but alternatively or additionally may be dynamic, such as social networks based on ongoing communications activity. Social network system 54 may interact with various social network members not shown in FIG. 2.

Profile generation server 52 is in further communication with one or more content sharing systems 58. For example, a content sharing system 58 may comprise a peer-to-peer (P2P) file sharing system, hybrid P2P system, or centralized content sharing system that allows various clients to share digital files such as photographs, audio files, and/or video files with one another. In some embodiments, content sharing system 58 may be social-network-aware, such as a system that allows for controlled viral distribution of content based on social network considerations such as distance between an originating user and a receiving user. In other embodiments, content sharing system 58 may comprise a distribution system utilizing one or more centralized servers for distribution to content sharing clients (not shown in FIG. 2).

In any event, content sharing system 58 has access to content sharing data 60 and related content metadata. For instance, content sharing data 60 may comprise content sharing system metadata indicating distribution histories, user preferences, and other information about the flow of content to clients in a content sharing system 58. In some embodiments, the content sharing data includes content metadata and, in some instances, the actual shared content items. In other embodiments, some of the content and/or content metadata is distributed amongst the sharing clients. As was noted above with regard to social network systems, multiple content sharing systems may be utilized in the present subject matter.

Although shown in FIG. 2 as being maintained in a separate store 60, some or all content sharing data and/or metadata may be maintained in computer readable media associated with one or more content sharing clients (such as a client's locally-stored sharing history). Such distributed data may be accessed by content sharing system 58 and aggregated and/or may be accessed by profile generation server 52 via interaction with content sharing system 58 during the profile generation process.

In some embodiments, some or all of the components illustrated in FIG. 2 may be combined. For example, profile generation server 52 may be included as part of a social network system. Furthermore, the social network system may also provide content sharing functionality. As was noted above, some content sharing systems are social-network-aware; in some cases, the content sharing system and social networking system may be combined or interoperate independently of the profile generation server(s) 52. Similarly, each of the data stores may comprise multiple physical or logical units and/or may be combined with one another. Of course, any or all of the components illustrated in FIG. 2 may maintain regular, intermittent, or ongoing connections to one or more other systems. Furthermore, although connections are shown to social network members and to content sharing clients, it is to be understood that social network members and content sharing clients may partially or fully overlap.

Figure 3:
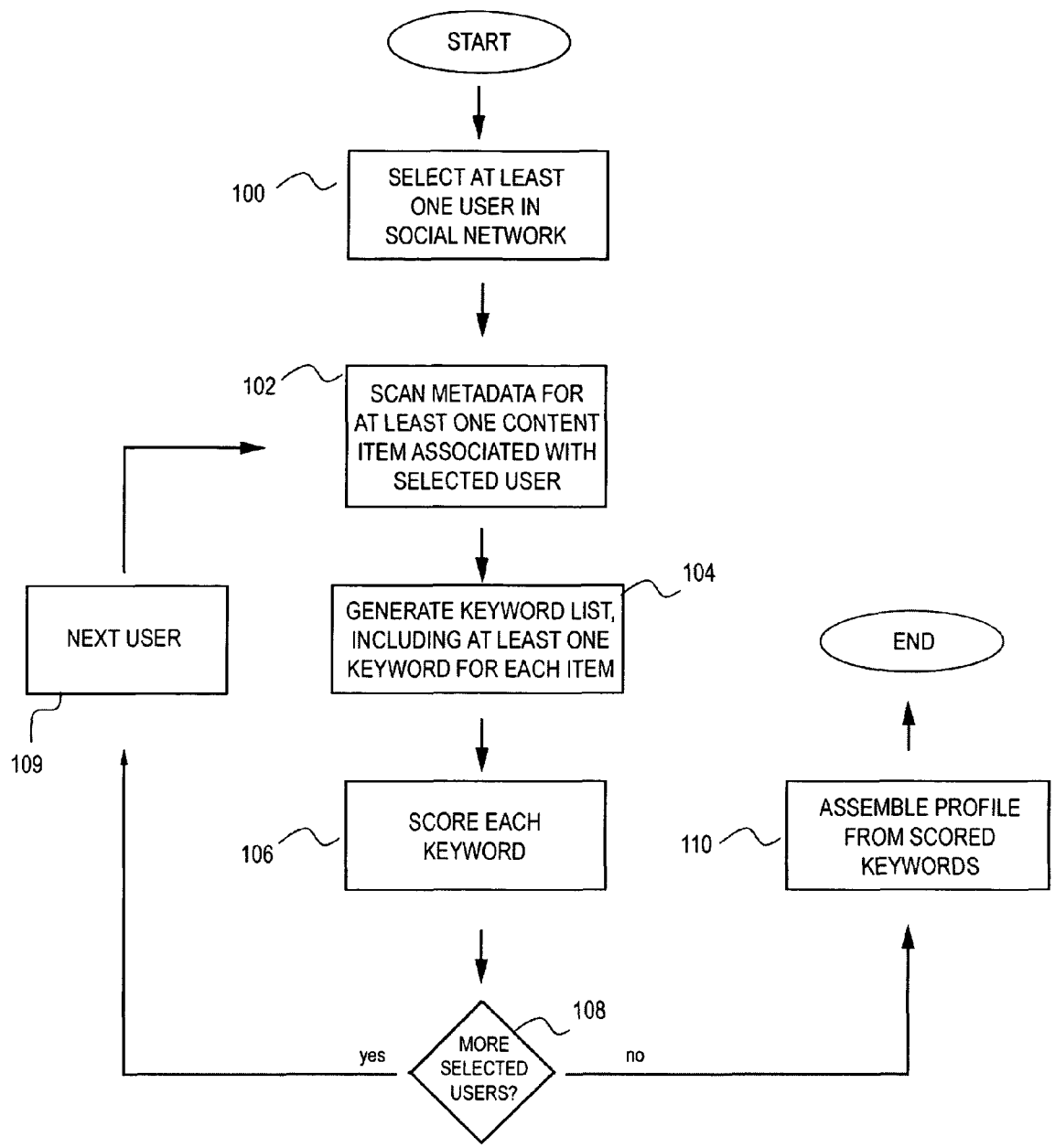
FIG. 3 is a flowchart illustrating exemplary steps in a method of classifying a target user.

FIG. 3 is an example of a process of generating a profile of a target user based on data including content metadata. The user profile may be used to classify the target user, such as in order to provide additional services. Examples of services for which the profile may be utilized include content and other recommendations, delivery of content such as advertisements, and permitting, prohibiting, or otherwise limiting access to network resources.

At 100, at least one user in the social network of the target user is selected. Selection can be based on any number of criteria and combinations thereof based on obtaining candidate users from one or more social network systems 54 and comparing such candidates to selection criteria. For example, one or more users may be selected based on criteria including, but not limited to: distance from the target user, degree of connection to other users in the social network, type(s) of relationship to the target user, explicit inclusion or exclusion of groups/users by the target user, and trust level of the target user with regard to the other user (or vice-versa). For example, the target user may specify one or more parameters for use in selecting other users for profile generation that specify minimal trust levels, maximum distance, and other inclusion/exclusion factors. In some embodiments, users may be selected based on compatibility—for instance, if social network data indicating user demographics is available, users may be selected for use in profiling a target user on the basis of matching demographics such as age, location, income level, and so on.

The system itself may have certain rules that are used in the selection process—for example, the system may enforce an upper limit on the number of users that may be selected for any particular instance of profile generation. Additionally, in some embodiments, each user in the social network may define one or more parameters that govern the use of that user's data in profiling other users. For example, the user may define privacy settings that specify that certain information, content items, or other data is off-limits to the system, such as designating private content that is not to be used in profiling other users.

Next, for each selected user, as shown at 102, metadata associated with at least one content item made available for sharing by the selected user is scanned. At 104, for each content item, a keyword list is generated. The actual location of the content item(s) and metadata is unimportant so long as it is accessible in some form to the profile generation server 52.

For example, some of the content items may be maintained in one or more computer-readable media associated with the selected user. For instance, some media files may be maintained by the selected user in a shared directory or other location known to one or more content sharing systems 58. Profile generation server 52 may query content sharing system 58 to determine what content items are made available for sharing by the selected user. Then, for each content item, profile generation server 52 may query the content sharing system 58 for metadata associated with the content item.

Content sharing system 58 may obtain lists of content items made available for sharing by users and content metadata from content sharing data store 60, for instance. However, in some embodiments, content sharing system 58 may access one or more computing devices associated with the selected user. For example, in response to a query by profile generation server 52 regarding a selected user, content sharing system 58 may access data maintained by the selected user, such as shared content items and related metadata, to return such data to the profile generation server. In other embodiments, profile generation server 52 may perform some or all of the content item and/or metadata inquiry. For instance, after receiving a list of content items made available for sharing by a selected user, profile generation server 52 may access one or more devices associated with the selected user without intermediate use of the content sharing system 58.

Step 104 relates to generating a list comprising one or more keywords for each content item. Keywords can be generated in any suitable fashion. For instance, keywords may be generated based on the content metadata—for example, summaries, annotations, or even the content itself may be scanned or otherwise mined for keywords. In some embodiments, keywords may be obtained directly from the metadata associated with a content item. For example, a digital photograph may be annotated by one or more tags, summaries, classifiers, or other identifiers. In any event, the keywords can be generated by profile generation server 52 either directly or indirectly. For instance, profile generation server 52 may use any suitable processing technique(s) to determine keywords, such as natural language processing. Keywords may be mined from content directly using, for instance, voice-to-text conversation and statistical or other analysis. Alternatively, profile generation server 52 may provide content items and/or metadata to one or more outside services that return applicable keywords.

The system may support any combination of standard keywords and user-defined key words. In some embodiments, the system may support a classification scheme such as content classification ontology with applicable keywords depending on where in the ontology a content item is classified.

Once one or more keywords have been generated, at 106 each keyword is then scored based on data including social network data regarding the selected user. For example, an initial keyword score may be generated and then weighed or otherwise adjusted based on social network data. As an example, an initial score for a keyword may be derived by counting the occurrence of the keyword for each content item. As another example, an initial score for a keyword may be defined in a lookup table or other resource. For example, as was noted above, the system may maintain an ontology of keywords. The ontology may further include points values for each keyword. Several examples of scoring scenarios are discussed below wherein the initial or base keyword score is adjusted. However, the scoring rules and parameters are provided for purposes of example only. Still further types of scoring and combinations of scoring methodology are possible using, for instance, different parameter types and definitions, different values, and different score calculation schemes.

For example, keywords may be scored based on the relationship between the selected user and target user as defined by data from one or more social network systems 54. For instance, more influence may be given to selected users that are closer in the social network to the target user by weighing keywords derived from content made available for sharing by such closer users more heavily. For example, a keyword score may be multiplied by an adjustment factor that is inversely proportional to social network distance. The social network distance may be obtained, for example, by profile generation server 52 sending a query to one or more social network systems 54. For example, social network 54 may provide a measure of distance such as degrees of separation, levels, or other indicator. Profile generation server 52 may include additional data in the query or queries in some embodiments. For example, profile generation server 52 may provide parameters such as path selection criteria that may provide how the distance calculation is to proceed, for example, by providing rules for resolving cases in which multiple paths between users result in multiple distance measurements.

As another example, keywords may be scored based on the degree of trust between the target user and the selected user. For instance, content made available for sharing by highly-trusted users may have high influence, while content made available for sharing by less-trusted users has little to no influence. Trust may be determined based on querying social network system 54 to determine if the users have provided data indicating trust. Additionally, as noted above, users in the target user's social network may be selected for use based at least in part on trust level in some embodiments. For instance, some social network systems provide for users to rate one another in terms of trust. If the target user has provided a trust rating for the selected user, the trust rating or a derivative thereof may be used to scale points while scoring keywords derived from content made available for sharing by the selected user. For example, in a system in which trust is rated on a scale of 1 to 10 (10 being highest), a target user's rating of "7" for the selected user can result in the selected user's keyword scores being multiplied by 7.

However, trust ratings may not be available in all circumstances—for instance, the user classification system may rely on content from a selected user who has not been rated by the target user in terms of trust. The scoring process may utilize trust ratings of the selected user by one or more users other than the target user, with the ratings of the other user(s) scaled based on distance of each other user to the target user. For example, assume that a selected user has not been rated in terms of trust by a target user. However, the selected user may have been rated a "5" by a second user. If the second user is 2 levels away from the target user, the second user's rating of "5" may be divided by the distance (2 in this example) to infer a trust rating of "2.5" for the selected user. Other rules for inferring trust are possible, of course, or trust levels may not be inferred at all in some embodiments.

Alternatively, when a trust level is unavailable, one or more other resources may be consulted, such as one or more trust assessment systems. Exemplary trust assessment systems are described in the presently-pending U.S. Patent Application of Richard Walsh, Christopher Amidon, and Alfredo Issa entitled SYSTEM AND METHOD FOR SOCIAL NETWORK TRUST ASSESSMENT, U.S. patent application Ser. No. 11/636,910, filed Dec. 11, 2006 and assigned to Qurio Holdings, Inc. For example, profile generation server 52 (and/or social network system 54) may query a trust assessment system for the target user's rating of the particular selected user in question. The trust assessment system may return trust assessment data that may be used to determine applicable scoring or selection actions by server 52 with regard to keywords generated from content associated with the selected user.

In some embodiments, thresholding may be applied to trust levels as part of the scoring process. For example, only trust levels above a defined threshold value may be used to adjust points for a selected user. As another example, ranges of trust levels may be defined wherein a certain multiplier is used for any trust level falling within specified ranges. Furthermore, trust ratings may result in lowering the score of a keyword or set of keywords. For example, if a target user rates a selected user below a certain level or with a negative rating, the points contributed by that user may be multiplied by a negative factor.

A further example of scoring adjusts keyword points based on relationship types. For example, social network 54 may support definitions of different types of relationships, including, but not limited to: friend, co-worker, family, club/organization member, and acquaintance. Other types may include business relationship types such as customer, supplier, subscriber, partner, and so on. The relationship types may be specified by the users involved and/or may be inferred based on other social network data, such as group membership or participation in other activities. Different relationship types between the target user and the selected user may result in different scaling of points for keywords derived from content items made available for sharing by the selected user. For example, family relationships may be given a multiplier of "5", friend relationships a multiplier of "4", club/organization relationships a multiplier of "3", and so on. In some embodiments, multiple relationship types may be involved—for example, a target user may be linked to a selected user by a path including one or more intermediate users. The classification system may factor in the distance along the path, for instance, by using a multiplier such as (sum of applicable relationship type modifier(s)/distance). In other embodiments, the type designators provided by users other than the target user may be ignored, or may result in a different scaling factor.

Another example of scoring adjusts keyword points based on considering the selected user's role in the social network. For example, social network data may be used to determine various measures of a selected user's centrality to or connectedness in a social network. For example, centrality may be determined using principles of graph theory and network analysis. For example, eigenvector centrality may be used as part of determining centrality of a user. Keywords from highly-connected users may be scored differently than keywords from less-connected users. For example, in a given social network, some users may be highly connected, such as by having multiple links throughout the network. Other users may have only a few links. Adjustment factors may be used to change the relative contribution of such users—for instance, in some embodiments, it may be advantageous to weigh the highly-connected users less heavily than the users with lower connectivity in order to gain a more balanced view of the social network. Alternatively, content shared by highly-connected users may be weighed more heavily.

In another example of scoring, the system adjusts keyword points based on considering the selected user's length of participation in the social network. For example, keywords derived from content made available for sharing by a selected user with greater longevity in a social network may be given greater weight than keywords derived from content made available for sharing by a newly-joined member, or vice-versa. For instance, a keyword's score may be multiplied by a duration adjustment such as (days in social network/365). As another alternative, participation length may be used as a threshold: a selected user's content will contribute keyword points only if the selected user has been participating in the social network for a long enough time. As a still further alternative, the system may select a multiplier based on a duration range. For example, points from selected users with duration less than 14 days may be given a multiplier of "0.5"; points from selected users with a duration of 14-60 days may be given a multiplier of "1.0"; while points from selected user with a duration of 60 days or more may be given a multiplier of "2." Of course, combinations of set points, thresholds, and multipliers derived from duration are possible.

In another example of scoring, the system adjusts keyword points based on considering the selected user's location. For example, the selected user may provide a profile or other data to the social network system, the content sharing system, and/or other systems indicating a geographic or other location. Additionally or alternatively, the selected user's and/or target user's location could be determined based on data from one or more location-based services, such as GPS-enabled mobile devices or other devices or systems, or when user client systems are linked directly or indirectly to systems that are enabled with location-based services including, but not limited to, wireless access points or the like that are aware of their relative geographic location. Metadata associated with access points, communication links or shared content items can include geographical identifiers. In any event, awareness of user location(s) allows scores of keywords derived from a shared item (or items) to be adjusted based on the geographic location of the sharing user(s).

For example, keyword scores may be increased or decreased for content items shared by users within certain predefined geographic areas (e.g., a 100-mile radius, a given quadrant area, a given state, county, city or other defined boundary area or areas). For example, in one embodiment keyword scores may be increased when such keywords are derived from content shared by users that are geographically closer to a target user. In other embodiments, keyword scores may be increased for keywords derived from content shared by from less proximate users. It should also be appreciated that multiple different geographic areas may be defined to correspond to different possible multipliers or other scoring criteria. For example, keywords generated from content shared by users in the same state as the target user (e.g., North Carolina) may be assigned a multiplier of "5"; if the content is shared by a user outside of NC but within the United States, a rating of "4" is assigned, if shared by a user outside the U.S. a rating of "3" is used, etc. In other example, keywords derived from content shared by users within a 100-mile radius receive one rating, keywords derived from content shared by users within a 500-mile radius receive another rating, while keywords derived from content shared by users within a 1000-mile radius receive a still further rating. Other variations of single or multiple mappings of geographic areas to scoring adjustment factors may be practiced in accordance with the disclosed technology.

In another example of scoring, the system adjusts keyword points based on determining the relevancy of a content item. More relevant items may be weighed more heavily than less relevant items, with relevancy determined based on the target user's response to the items or prior distributions of other items. For example, content sharing system 58 may maintain a history of past distributions. Based on the paths taken by prior distributions, scope of distribution, and feedback data reflecting user response to the items distributed to and from the target user, the content sharing system may be able to provide data suitable for use in determining which users favor which types of content. Content sharing system 58, profile generation server 52, and/or any other systems may perform the actual relevancy determination. For instance, the distribution history may include data indicating which users downloaded, viewed, shared and deleted shared various content items and how users performed those (and other) actions for each content item.

The target user's response to certain content items may be determined based on the target user's actions with regard to the items. The responses can be grouped by different types of content, for example, by examining content metadata, to determine which types of content metadata correlate to positive responses. For example, if a target user repeatedly deletes content items with metadata regarding "figure skating," the system may infer that other content items with "figure skating" metadata are less relevant or irrelevant to the target user as compared to other items. Thus, a selected user's shared content can be weighed for relevancy to the target user. Continuing with the example above, if a shared user's content items include "figure skating" metadata, such items may be weighed less heavily in the scoring process. Similarly, if a selected user's content items share metadata similar to items widely shared by the target user, the selected user's content items may be more relevant.

In some embodiments, keyword point contributions may be normalized to prevent a target user's profile by being skewed. For example, some users in a social network may contribute large amounts of content, while others contribute less. Without normalization, a target user's profile could be inordinately skewed to be more reflective of the contribution by the more content-prolific user(s). Therefore, in some embodiments, a selected user's contribution may be normalized based on the amount of content contributed by the selected user. Normalization may occur as part of the keyword scoring process, or may occur as part of assembling a target user's profile once keywords from all the selected users have been collected.

Returning to FIG. 3, for instance, once a list of scored keywords has been developed for a selected user, at step 108 the system determines if there are more selected users to consider. If so, then at step 109, the process returns to scanning metadata, generating keywords, and scoring each keyword for the next user(s) until all selected users have been considered. Then, at step 110, a profile is assembled from the scored keywords. In some embodiments, the profile comprises the raw list of keywords and scores (although additional information may also be included). However, as noted above, it may be advantageous to adjust the keyword scores to gain a more accurate view of the target user.

For example, the user classification system can analyze a target user's keyword list and determine the total keyword point contribution by each selected user. Keyword scores derived from users who have provided a large amount of content may be reduced such that the aggregated points provided by each selected user are more in line with one another. For example, points of the top 10% contributing selected users may be reduced to that of the contributions of the 89th percentile. As an example, if a top 10% contributing selected user contributed 10,000 points, while the 89th percentile user contributed 5,000, the scores for keywords derived from content items made available for sharing by the top 10% contributing user may be reduced by one half (0.5).

However, the particulars of any normalization scheme may be selected such that any normalization effects are balanced against the possibility of over-dampening the contribution of highly influential users. Furthermore, normalization schemes should not entirely negate the effects of user relationships.

An alternative normalization methodology uses points allocation profiles for each selected user. Such normalization may occur as part of assembling a target user's profile. However, alternatively, scores may be normalized on this basis during scoring for keywords provided by each selected user. In any event, each user of the classification system is provided a set number of points to be allocated amongst the keywords derived from that user's content. Based on allocating the points amongst keywords, the number of occurrences for each keyword is adjusted. The adjusted occurrences are then scored.

For example, after a list of keywords is assembled for use in a target user's profile, the list may be analyzed to determine a selected user's total keyword contribution to the profile. If a particular keyword contributed 5% of the total keyword occurrences, then that keyword may be given 5% of the selected user's total points. For instance, if a user is allocated 100 points and the keyword "star trek" constitutes 5% of the total occurrences of keywords contributed by the selected user, then the "star trek" keyword may be allocated 5 points. In some embodiments, a user may provide a points allocation profile that directs the system as to how to allocate points during the normalization process. For example, a user may specify that certain keywords are to be ignored, weighed less heavily, or weighed more heavily in the normalization process when said user is a selected user for generating a target user's profile.

Normalization may also occur during the keyword generation process. For example, certain content items may have a large amount of metadata, while other content items have little or no metadata. In some embodiments, the system may take such disparity into account by having a points contribution ceiling for each piece of content. As an example, assume that the system limits each piece of content to a maximum of 100 points. Assume further that keywords from a particular over-ceiling piece of content, when aggregated, total 500 points. The points for such keywords may be scaled such that the content item does not contribute points greater than the ceiling. For example, if the keyword "star wars" contributed 50 points to the over-ceiling piece of content, the point value for "star wars" could be scaled by a factor such as (maximum/actual), or 100/500, to yield a final contribution value of 10. With other keyword contributions scaled by the same factor, the final aggregate points for keywords derived from the over-ceiling piece of content may be reduced to 100.

User profiles may be computed at any suitable time or times. For example, in some embodiments, user profiles may be generated on a periodic basis. Additionally or alternatively, profile generation may be event-driven. For instance, the system may monitor a user's social network for churn, such as changes in composition and/or activity levels, and recalculate profiles when churn exceeds a certain amount or when one or more specified events occur. Alternatively, churn may be monitored such that a profile is not generated until social network churn has settled (i.e. the social network becomes quiescent).

Additional parameters and rules may be considered in the process of generating user profiles. For example, user-defined or system parameters may specify that metadata from certain types of content or certain content items is not to be scanned. For instance, a user may provide privacy rules that set forth which items are off-limits to the system for profile generation. As another example, the system may skip certain file types, files of a certain size, or make other content item selections based on other content item metadata (such as date, length, etc.). Similarly, certain keywords may be excluded from use. For instance, users and/or the system may specify that certain content items or content items having certain metadata are off-limits to the system. For instance, if a content item's metadata indicates that the item includes adult content such as material of a violent, sexual, or disturbing nature, keywords from the item may be excluded from use in the profile generation process. For example, the metadata may include ratings or other indicia of appropriateness. As another example, keywords from the item may be compared to a block/allow list.

Use of particular content items and/or keywords may depend on preferences of the target user or the selected user. For example, a target user may specify certain users whose content is to be included or excluded regardless of other parameters. Similarly, a target user may specify certain types of content, certain content items, and/or certain keywords to be disregarded or included regardless of other factors.

Use of content items for keyword generation may further depend on each selected user's treatment of the item. For example, in some embodiments, a the determination of whether or not to use a content item is based in part on the target user's access rights relative to the content item. For example, in some embodiments, a selected user's content item may not be used in profiling a target user unless the target user has access to the content item. In other embodiments, keywords from an item not shared with a target user may be utilized in a reduced role in the target user's profile.

Similarly, if different versions of a content item are shared, then the influence of the item in a target user's profile may depend upon the version(s) which the target user may access. In some content sharing systems, users can share items of different quality levels based on factors such as position of the receiving user in the social network. If a selected user shares a high-quality version of an item and a low-quality "preview" version, in some embodiments, a target user's profile will comprise different keywords depending upon whether the target user may access the high-quality version or simply the low-quality "preview" version. For example, if the target user can access only a "preview" still from a movie, then the target user's profile may include fewer or different keywords than would be derived from the full-length movie.

Although the examples herein have discussed profiling a target user based on content made available for sharing by other users, a target user's profile may take into consideration content made available for sharing by the target user as well. For example, in some embodiments, three separate profiles are generated: a first profile based on the target user's content only, a second profile based on content from the target user's social network, and a third profile based on content from both sources. In some embodiments, an additional multiplier may be utilized for content that is made available for sharing by the target user and one or more other users in the target user's social network. For example, if a target user's friend is has shared a certain content item, the content item may be weighed more heavily if metadata indicates that the target user has obtained, viewed, or otherwise interacted with the content item.

Content items may be associated with a selected user in any suitable manner. For example, as noted above, content items may be associated with a selected user when the selected user makes such items available for sharing, such as by placing the item in a shared folder or otherwise making the item available to other users. However, in some embodiments, a content item may be associated with a selected user in other manners. For example, if a content item includes licensing or rights information, the content item may be associated with one or more users based on the rights data, such as ownership, author data, or other information. Similarly, content distribution history data may be used to trace a particular item to one or more users whereby the user(s) will be associated with the item.

For example, assume a first user makes an item available for sharing and it is downloaded by a second user who also makes the item available for sharing. In some embodiments, the item may be treated as associated with each of the first user and the second user when each user's content is used to generate target user profiles. However the profile generation system may have one or more complex rule sets that govern such situations—for example, if the same item is associated with two different users selected for generating a target user's profile, then the scores for keywords from the item may be adjusted. For instance, content metadata associated with the item (such as the licensing information and/or distribution history data mentioned above) may be accessed and the system may recognize that the item is more closely associated with the first user than the second user and adjust they keyword scores for the item in a manner that recognizes the spectrum of association.

Several scenarios of profile generation for use in classifying users will now be discussed in conjunction with FIGS. 1, 2, and 3. However, all such examples are for purposes of illustration only and are not intended to be limiting. In the following examples, three users from social network 10, namely users J, A, and D will be profiled based on social network content metadata. The weight of keywords is increased under certain conditions. Specifically, keyword points for content items are multiplied based on the relationship between the target user and the selected user sharing the item(s). In these examples, "family" relationships multiply keyword points by a factor of 5, "friend" relationships multiply keyword points by a factor of 4, "co-worker" relationships multiply keyword points by a factor of 1, and "group affiliate" relationships multiply keyword points by a factor of 2.

In these examples, a simplified trust model is used. A user must have a trust level of 3 or above to be selected for a particular target user's profile. Points for keywords derived from content shared by users having a trust level above 3 are multiplied by the trust level. If a target user has not specified a trust rating for a selected user, a trust rating is inferred from another user's rating of the selected user by using the other user's rating of the selected user divided by the distance between the target user and the other user (i.e. the user who provided the rating). Furthermore, in the event of multiple inferences, the highest inference is controlling, while a target user's explicit trust rating is controlling over any inference. However, as noted above, the particular inference scheme is for purposes of example only. For example, trust ratings may be obtained in any suitable manner, such as by consulting a trust assessment system. Alternatively, different rules for inferring trust levels may be applicable.

The conditions and weighing factors for selecting users and scoring keywords may have been supplied by each the selected and/or target users. Some or all of the conditions and weighting factors may be system parameters. In some situations, users may have modified the default settings.

Assume the system is generating a profile for user J. This example will illustrate general concepts of keyword generation and scoring. Additionally, the example will illustrate how a close relationship between users can trump keyword volume.

Initially, one or more social networks will be accessed to select users whose content metadata will form the basis of J's profile. In this example, assume user J has specified that only users within one degree of separation may be used to profile user J. Accordingly, in this example, user J is profiled based on content made available for sharing by user I and user B. User B has a collection of shared content that is generally baseball-related and moderately populated with keywords, while user I has provided only some content, which is related to winter sports.

For example, assume that profile generation server 52 contacts a content sharing system or systems 58 to obtain a list of content items shared by user I. Furthermore, content metadata associated with each content item may be scanned to determine a list of keywords and the number of occurrences of each keyword for each item. For example, assume a scan of user I's content yields the following information:

TABLE 1

Content Items and Keyword Occurrences for User I

| Content Item | Keyword | Number of Occurrences |
|---|---|---|
| video 1 | skiing | 2 |
| video 1 | Denver | 1 |
| video 1 | lodge | 1 |
| video 2 | skiing | 2 |
| video 2 | snowboarding | 3 |
| video 3 | St. Bernard | 2 |
| video 3 | lodge | 1 |
| video 3 | ski | 2 |
| photo 1 | ski | 1 |
| photo 1 | snowboarding | 2 |
| photo 2 | Denver | 1 |
| photo 2 | skiing | 1 |

TABLE 1-continued

Content Items and Keyword Occurrences for User I

| Content Item | Keyword | Number of Occurrences |
| --- | --- | --- |
| photo 3 | ski | 1 |
| photo 3 | skiing | 2 |

For purposes of this example, user I's keywords will not be normalized for specific content items.

Next, each keyword is scored based on one or more scaling factors. Assume that the system accesses social network data indicating that I and J have classified their relationship as "brothers." Therefore, the family multiplier of 5 is applicable. Furthermore, assume user J has rated user I with a trust level of 6. Therefore, user I's total multiplier is 6*5=30 and keyword contribution is as follows:

TABLE 2

Total Keyword Occurrences and Scores for User I

| Keyword | Occurrences | Keyword Score |
| --- | --- | --- |
| skiing | 7 | 210 |
| Denver | 2 | 60 |
| lodge | 2 | 60 |
| snowboarding | 5 | 150 |
| ski | 4 | 120 |
| St. Bernard | 2 | 60 |

Next, content made available for sharing by user B, the other selected user in this example, is examined. For instance, as before, classification server 52 may access one or more content sharing systems utilized by B to obtain a list of content items, related content metadata, and to determine the occurrences of keywords in user B's content. Assume that user J has rated user B with a trust level of "3" and that users J and B are indicated as "friends" from applicable social network data. Accordingly, user B's keywords will be given a multiplier of 4, with no additional trust-level bonus in this example. User B's keyword occurrences and scores as adjusted for user J's profile are set forth below:

TABLE 3

Total Keyword Occurrences and Scores for User B in Profiling User J

| Keyword | Occurrences | Keyword Score |
| --- | --- | --- |
| Red Sox | 11 | 44 |
| Yankees | 5 | 20 |
| baseball | 13 | 52 |
| snowboarding | 8 | 32 |
| Boston | 7 | 28 |
| Ty Cobb | 2 | 8 |
| Braves | 3 | 12 |
| grand slam | 8 | 32 |

Keyword contributions from User I and User B may be combined into a scored keyword list for inclusion in a profile of User J as follows:

TABLE 4

Scored Keyword Profile for User J

| Keyword | Source | Occurrences | Keyword Score |
| --- | --- | --- | --- |
| skiing | I | 7 | 210 |
| Denver | I | 2 | 60 |
| lodge | I | 2 | 60 |
| snowboarding | I | 5 | 150 |
| ski | I | 4 | 120 |
| St. Bernard | I | 2 | 60 |
| Red Sox | B | 11 | 44 |
| Yankees | B | 5 | 20 |
| baseball | B | 13 | 52 |
| snowboarding | B | 8 | 32 |
| Boston | B | 7 | 28 |
| Ty Cobb | B | 2 | 8 |
| Braves | B | 3 | 12 |
| grand slam | B | 8 | 32 |

In some embodiments, as noted above, contributions of users may be normalized. In this example, however, only two users were used for profile generation, so percentile-based normalization may not be applicable. Furthermore, other normalization schemes may not be applicable since neither user I nor B has unduly influenced the profile—for example, as noted below, normalization may be triggered by a content item and/or a selected user's points contributions exceeding a minimal level. In this example, assume that no such level (or other triggering parameter(s)) applies. Accordingly, data included in a final scored profile would be essentially the same as set forth in Table 4, although the "snowboarding" keyword scores could be combined for a total of 182 points.

As will be apparent from the foregoing example, user B's content generally had more keyword occurrences than user I's content. Accordingly, user J's profile would have been skewed towards user B's baseball-centric interests but for the additional scaling of user I's keywords due to user I and J's closer relationship as reflected by social network data. Instead, however, while taking into account user B's baseball-related contribution, user J's profile reflects greater interest in winter sports.

Next, an example of generating a profile for user A will be provided. This example will build on the general concepts of keyword generation and scoring but will also provide an illustration of how the system avoids profile skewing by users sharing large amounts of content, as well as additional aspects of profile generation.

In this example, assume that user A has indicated to the profile generation system that users within two degrees of separation may be used to generate profiles for user A. In this example, such a criterion means that users J, K, B, C, D, E, L, and F may possibly be considered. However, in this example, some of the users may be excluded from consideration due to other factors.

For example, assume that user A has rated user K with a trust level of "2," and a minimal trust level of "3" is required for use in profiling A. User K may be therefore be excluded. Although a profile was generated for user J in the example above, user J may be excluded, for example, if user J is presently not sharing any content with the social network and/or user J has restricted user A from accessing his content. User D may have recently joined the social network, for instance two days before A's profile is generated. If a participation length threshold requires, for example, at least 3 weeks of participation before a user's content can be used in profiling, then user D's content may not be used in profiling A. Accordingly, in this example, user A is profiled based on users B, C, E, F, and L.

The field may be further narrowed amongst the selected users. For instance, user F may be a longtime participant in the social network and may be positively regarded by the other users and may have adequate trust level ratings for selection. However, upon scanning the content metadata, the system may note that user F's content is inappropriate for use in profiling—for instance, her metadata may result in a list of unacceptable keywords if user F is sharing content of an adult nature. Accordingly, user F's excluded keywords do not factor into A's profile in this example.

Assume user B is selected next and B's keyword occurrences are the same as set forth above in Table 3. However, the score for user B's keywords may differ based on user B's relationship with user A. For example, assume that A and B's relationship is "friend," which invokes a multiplier of 4. Furthermore, assume that user A has not rated user B for trustworthiness. In this case, user J has rated user B as a "3" in trustworthiness, but inferring user J's rating results in a trust level of only 1.5, which is insufficient. However, assume user C has rated user B with a trust level of "8." User C is two levels away from user A (using the shortest path from A to C). Therefore, user B's trust rating would be 8/2=4, which meets the trust threshold and provides a multiplier effect. User B's total multiplier is 4*4=16, which results in the keywords and scores shown below:

TABLE 5

Total Keyword Occurrences and Scores
for User B in profiling User A

| Keyword | Occurrences | Keyword Score |
|---|---|---|
| Red Sox | 11 | 176 |
| Yankees | 5 | 80 |
| baseball | 13 | 208 |
| snowboarding | 8 | 128 |
| Boston | 7 | 112 |
| Ty Cobb | 2 | 32 |
| Braves | 3 | 48 |
| grand slam | 8 | 128 |

Next, content items made available for sharing by User C are scanned for metadata and keywords generated. Assume, for example, that User C is a fan of comic books and has shared various tagged comic book images. The tags could be scanned and rendered into a keyword list. Assume further that user C has not been rated for trust by user A, but is rated as a "3" by user B. Since user B is one level away from user A, user A's trust level of C is inferred to be "3" as well. Thus, no trust multiplier is applicable.

User C's keywords may be scored based on a distance multiplier, though. In this example, user C is two levels away from user A. Assume users A and B are "friends" and users B and C are "co-workers." In this example, no relationship type modifier is used unless the target user (in this case, user A) has specified a relationship. Therefore, user C's keywords will be scored by a distance adjustment of (½)=0.5. However, in other embodiments, the relationship type modifiers can be combined and manipulated. For example, the modifiers could added and then divided by the distance between the target user and the selected user. In such a case, the relationship type modifier would be (4+1)/2=2.5. However, as noted above, the system in this example is using the distance modifier alone. User C's keywords are scored as follows:

TABLE 6

Total Keyword Occurrences and
Scores for User C in profiling User A

| Keyword | Occurrences | Keyword Score |
|---|---|---|
| Spider man | 20 | 10 |
| Batman | 40 | 20 |
| Superman | 16 | 8 |
| Wonder Woman | 15 | 7.5 |

Next, assume that the system scans metadata associated with content items made available for sharing by user L. Like user C, user L is two levels away from user A, so, in the absence of other factors, the scaling factor used for keywords derived from user L's shared content will be 0.5. Furthermore, assume that user G has rated user L's trust level as "9." Since user G is three levels away from user A, user A's inferred trust level based on user I's rating is "3." Therefore, user L's content is considered, but receives no trust multiplier effect. However, user L may have been a longtime participant in user A's social network. For example, assume that users A and L have participated in the same social network for 2 years. Assume further that the system provides a point multiplier of 2 for each year a user has participated in the social network beyond one year. Therefore, user L's points are scored using a scaling factor of 0.5*2=1.0.

In this example, user L is an avid bird watcher and has shared a 100-page field guide to bird sightings along with some additional unrelated content. For instance, user L's content items and associated keywords may be as follows:

TABLE 7

Content Items and Keyword
Occurrences for User L

| Content Item | Keyword | Number of Occurrences |
|---|---|---|
| bird guide | bird | 408 |
| bird guide | parakeet | 234 |
| bird guide | eagle | 289 |
| bird guide | hawk | 277 |
| bird guide | egg | 300 |
| bird guide | nest | 435 |
| bird guide | migrate | 360 |
| bird guide | birdseed | 197 |
| photo 1 | water park | 23 |
| photo 2 | Florida | 48 |
| photo 3 | cruise | 67 |

In this example, User L's shared bird guide may heavily skew the profile generation results for user A since user L will generate a great deal of bird-related keywords. Therefore, content item thresholding may intervene. For instance, each content item may be limited by reducing the occurrence count based on the keyword's relative frequency in the content item. As an example, each occurrence of a keyword in a content item may be given one point to obtain an aggregate total for that piece of content. In this example, the keywords derived from the content item "bird guide" contribute 2500 points. Assume for this example that the limit for any one piece of content is 250 points. Accordingly, the occurrences of keywords from the bird guide will be reduced by a factor of 250/2500=0.1. User L's other content items do not exceed the threshold, so keyword occurrences from those items are not scaled. In this example, the (scaled) occurrence value is multiplied by the scaling factor of 1.0 calculated above to yield a score for each of user L's keywords.

TABLE 8

Total (Adjusted) Keyword Occurrences and
Scores for User L in profiling

| Keyword | (Scaled) Occurrences | Keyword Score |
|---|---|---|
| bird | 40.8 | 40.8 |
| parakeet | 23.4 | 23.4 |
| eagle | 28.9 | 28.9 |
| hawk | 27.7 | 27.7 |
| egg | 30 | 30 |
| nest | 43.5 | 43.5 |
| migrate | 36 | 36 |
| birdseed | 19.7 | 19.7 |
| water park | 23 | 23 |
| Florida | 18 | 18 |
| cruise | 19 | 19 |

User A

Finally, User E is selected. Assume that the social network data indicates that users E and A are co-workers and user A has rated user E as a "6" in trustworthiness. Accordingly, absent any additional modifiers, keywords derived from content made available for sharing by user E would be scored using a multiplier of 6. In this example, user E is a prolific sharer of content related to science fiction. Unlike user L, whose content yielded many keywords from a single content item, user E shares massive amounts of similar content such that keyword occurrences, although low for each individual content item, become very high when aggregated. User E's keywords are illustrated below:

TABLE 9

Total Keyword Occurrences and Scores
for User E in profiling User A

| Keyword | Occurrences | Keyword Score |
|---|---|---|
| trek | 189 | 1134 |
| Kirk | 112 | 672 |
| Picard | 135 | 810 |
| space | 233 | 1398 |
| death star | 87 | 522 |
| serenity | 113 | 678 |
| alias | 76 | 456 |
| buck rogers | 190 | 1140 |

As will be apparent, user A's profile may be heavily skewed by user E's contributions. For example, if the keyword lists derived from content made available for sharing by users B, C, L, and E are simply combined, then user E will contribute 6,810 points out of a total of 8086.7 points—that is, user E will contribute around 84% of the points in user A's profile. Although users A and E may share a good relationship, user E's content may not represent all of user A's interests. For instance, in this example, user A is connected to users of diverse interests whose contributions may be drowned out by user E. This may be the case for when other users connected to E are profiled as well, as user E's sheer volume of content could unduly influence users that are not as closely related to user E as user A.

Therefore, user E's points contribution may be normalized. As was noted above, normalization may be based on analysis of user A's profile so that any particular user's contribution may be normalized relative to other selected users. For instance, user E's contribution could be scaled based on a percentile analysis as noted above. For example, assume that user E is in the top 10% of points contributors to A's profile, while the 89th percentile of contributors are in the 800-900 point range. Points calculations based on user E's content may therefore be subjected to a substantial normalization modifier.

Alternatively, user E's points may be normalized based on the relative frequency of keywords prior to applying scoring factors. For example, user E may be provided with 100 points to allocate across all keywords that will be contributed to A's profile. The points may be allocated automatically, for example, by determining the relative percentage of each keyword's occurrence. Alternatively, user E may specify how the points are to be allocated amongst the various keywords. In the table below, keywords derived from user E are adjusted so that the keyword occurrences total 100 (prior to scoring based on the A-E relationship).

TABLE 10

Total Keyword Occurrences (Normalized)
and Scores for User E in profiling

| Keyword | Occurrences | Normalized | Keyword Score |
|---|---|---|---|
| trek | 189 | 16.7 | 100.2 |
| Kirk | 112 | 9.9 | 59.4 |
| Picard | 135 | 11.9 | 71.4 |
| space | 233 | 20.5 | 123 |
| death star | 87 | 7.7 | 46.2 |
| serenity | 113 | 10.0 | 60 |
| alias | 76 | 6.7 | 40.2 |
| buck rogers | 190 | 16.7 | 100.2 |

User A

In this example, user E's keywords still contribute a large percentage of the total points—600.6 out of a total of 1877.3 points (about 32%). However, this may provide a more accurate depiction of user A's interests in light of A's positive view of E. A's final profile will comprise the keywords and scores from Tables 6, 8, and 10.

The final example of user profiling is user D. Assume for this example that user D has provided for profiling based on users within two degrees of separation. Accordingly, users B, C, E, A, F, and L may be utilized. Furthermore, in this example, assume user D has recently joined the social network, and so her only affiliations are through a science fiction group including users C and E. Assume for this example that the underlying social network system rules provide that group membership results in an automatic designation of the minimal trust level and updates to relationship type data. Thus, the relationship data indicates that users C and E are "group members" with D and have a trust level of "3."

In this example, user A may qualify as a selectable member, but has no content. As was noted before, user F's content is not suitable for user profiling. Further assume that user D has rated user L at a trust level of "1." Accordingly, user L will not be used to profile user D. Therefore, the remaining members which may be selected are users B, C, and E.

Keyword lists for each of users B, C, and E may be generated as set forth above. However, the resulting keyword scores will differ since relationships between target user D and each of B, C, and E differ from the other target users of the above examples.

For instance, as noted above, user C has rated user B with a trust level of "8." Since user C is one level away from user D, then user D's trust level of B will be inferred to be "8".

However, user B is two levels away from user D. Therefore, user B's keywords will be scored using a factor of 8/2=4.

TABLE 11

Total Keyword Occurrences and Scores for User B in profiling User D

| Keyword | Occurrences | Keyword Score |
| --- | --- | --- |
| Red Sox | 11 | 44 |
| Yankees | 5 | 20 |
| baseball | 13 | 52 |
| snowboarding | 8 | 32 |
| Boston | 7 | 28 |
| Ty Cobb | 2 | 8 |
| Braves | 3 | 12 |
| grand slam | 8 | 32 |

Users C and E, on the other hand, are one level removed from user D. User D's trust level of each is the minimal trust level for consideration, but results in no multiplier effect. However, both users C and E are in the sci-fi club with user D, and so both users' keywords are scored using a multiplier of 2. For purposes of this example user E's scores are normalized to 100 points (pre-multiplier) as detailed above. The keyword scores for users C and E are presented below:

TABLE 12

Total Keyword Occurrences and Scores for User C in profiling User D

| Keyword | Occurrences | Keyword Score |
| --- | --- | --- |
| Spider man | 20 | 80 |
| Batman | 40 | 160 |
| Superman | 16 | 64 |
| Wonder Woman | 15 | 60 |

TABLE 13

Total Keyword Occurrences (Normalized) and Scores for User E in profiling

| Keyword | Occurrences | Normalized | Keyword Score |
| --- | --- | --- | --- |
| trek | 189 | 16.7 | 66.8 |
| Kirk | 112 | 9.9 | 39.6 |
| Picard | 135 | 11.9 | 47.6 |
| space | 233 | 20.5 | 82 |
| death star | 87 | 7.7 | 30.8 |
| serenity | 113 | 10.0 | 40 |
| alias | 76 | 6.7 | 26.8 |
| buck rogers | 190 | 16.7 | 66.8 |

User D

User D's social-network based profile will include information from Tables 11, 12, and 13, and may include designations identifying the user or users whose content served as the basis for each keyword. In this example, the scored keywords reflect user D's sci-fi interests even though user D herself is not sharing any sci-fi related content.

The particular examples of user profiling presented above are intended for purposes of illustration only. In practice, the number of social network members that may be candidates and selected for profile generation may be much larger. Furthermore, the number of content items, the extent of metadata, and the number of keywords derived from each item may vary greatly, and in some cases could be considerably larger than illustrated in the above examples.

Furthermore, additional profiling options may be considered. For example, as noted above, each target user may be profiled based on the target user's content in addition to or instead of content shared by members of the target user's social network. For example, such a profile of user B would comprise the keywords set forth in Tables 5 and 11. Scoring for keywords based on the target user's own content may utilize one or more "self" multipliers or other scoring mechanisms.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A non-transitory computer-readable medium comprising computer instructions embodied therein, wherein the computer instructions, when executed by at least one computing device, configure the at least one computing device to perform actions comprising:
    selecting a user from a plurality of users in a social network of a target user;
    scanning metadata associated with content items shared by the selected user;
    determining a list of keywords associated with the content items based on the metadata;
    accessing social network data associated with the selected user, the social network data including a relationship classifier that classifies a relationship between the selected user and the target user and a social network distance between the target user and the selected user, and a trust classifier that classifies a trust level between the selected user and the target user;
    determining a plurality of keyword scores based on the social network data, each of the plurality of keyword scores corresponding to one of the keywords on the list of keywords, wherein each of the plurality of scores is weighted by the trust classifier and an adjustment factor inversely proportional to the social network distance;
    normalizing individual keyword scores of the plurality of keywords scores based on a number of the content items shared by the selected user in comparison to a number of content items shared by other selected users of the plurality of users when the number of the content items shared by the selected user is greater than the number of content items shared by other selected users of the plurality of users; and
    generating a profile for the target user, the profile having the list of keywords and the corresponding plurality of keyword scores based on the scoring of each keyword.

2. The non-transitory computer-readable medium as set forth in claim 1, wherein scanning the metadata associated with the content items includes interfacing with at least one content sharing computing device and obtaining content metadata related to the content items.

3. The non-transitory computer-readable medium as set forth in claim 1, wherein accessing the social network data includes interfacing with at least one social network computing device and obtaining the social network data associated with the selected user.

4. The non-transitory computer-readable medium as set forth in claim 1, wherein determining the plurality of keyword scores includes determining a length of time the selected user has participated in the social network of the target user.

5. The non-transitory computer-readable medium as set forth in claim 1, wherein determining the plurality of keyword scores includes determining a type characterizing the relationship between the target user and the selected user.

6. The non-transitory computer-readable medium as set forth in claim 1, wherein determining the plurality of keyword scores includes accessing data characterizing the trust level between the target user and the selected user.

7. The non-transitory computer-readable medium as set forth in claim 1, wherein determining the plurality of keyword scores includes accessing data indicating a location of the selected user.

8. The non-transitory computer-readable medium as set forth in claim 1, wherein the computer instructions configure the at least one computing device to perform actions including:
  for each content item associated with each selected user, determining access rights of the target user to each content item;
  wherein generating the list of keywords is based at least in part on the access rights of the target user to each content item; and
  wherein no keywords are generated for any content items the target user cannot access.

9. The non-transitory computer-readable medium as set forth in claim 1, wherein the computer instructions configure the at least one computing device to perform actions further including:
  prior to scanning the metadata associated with the content items, first determining whether to access the metadata based on one or more access parameters.

10. The non-transitory computer-readable medium as set forth in claim 9, wherein at least one of the access parameters is a privacy setting.

11. The non-transitory computer-readable medium as set forth in claim 1, wherein the computer instructions configure the at least one computing device to perform actions further including:
  for each selected user, normalizing a contribution of points from the selected user to the target user's profile.

12. The non-transitory computer-readable medium as set forth in claim 11, wherein normalizing includes accessing data stored in a points allocation profile.

13. A computer-implemented method of profiling a target user having a social network including a plurality of users, the method comprising:
  selecting a user from the plurality of users in the social network of the target user;
  scanning metadata associated with content items shared by the selected user;
  determining a list of keywords associated with the content items based on the metadata;
  accessing social network data associated with the selected user, the social network data including a relationship classifier that classifies a relationship between the selected user and the target user and a social network distance between the target user and the selected user, and a trust classifier that classifies a trust level between the selected user and the target user;
  determining a plurality of keyword scores based on the social network data, each of the plurality of keyword scores corresponding to one of the keywords on the list of keywords, wherein each of the plurality of scores is weighted by the trust classifier and an adjustment factor inversely proportional to the social network distance;
  normalizing individual keyword scores of the plurality of keywords scores based on a number of the content items shared by the selected user in comparison to a number of content items shared by other selected users of the plurality of users when the number of the content items shared by the selected user is greater than the number of content items shared by other selected users of the plurality of users; and
  generating a profile for the target user, the profile having the list of keywords and the corresponding plurality of keyword scores based on the scoring of each keyword.

14. The computer-implemented method as set forth in claim 13, wherein scanning the metadata associated with the content items includes interfacing with at least one content sharing computing device and obtaining content metadata related to the content items.

15. The computer-implemented method as set forth in claim 13, wherein accessing the social network data includes interfacing with at least one social network computing device and obtaining the social network data associated with the selected user.

16. The computer-implemented method as set forth in claim 13, wherein determining the plurality of keyword scores includes determining a length of time the selected user has participated in the social network of the target user.

17. The computer-implemented method as set forth in claim 13, wherein determining the plurality of keyword scores includes determining a type characterizing the relationship between the target user and the selected user.

18. The computer-implemented method as set forth in claim 13, wherein determining the plurality of keyword scores includes accessing data characterizing the trust level between the target user and the selected user.

19. The computer-implemented method as set forth in claim 13, wherein determining the plurality of keyword scores includes accessing data indicating a location of the selected user.

20. The computer-implemented method as set forth in claim 13, further comprising:
  determining access rights of the target user to each content item associated with each selected user;
  wherein generating the list of keywords is based at least in part on the access rights of the target user to the content item; and
  wherein no keywords are generated for any content items that the target user cannot access.

21. The computer-implemented method as set forth in claim 13, further comprising:
  prior to scanning the metadata associated with the content items, determining whether to access the metadata based on one or more access parameters.

22. The computer-implemented method as set forth in claim 21, wherein at least one access parameter is a privacy setting.

23. The computer-implemented method as set forth in claim 13, further comprising:
  for each selected user, normalizing a contribution of points of the selected user to the target user's profile.

24. The computer-implemented method as set forth in claim 23, wherein normalizing includes accessing data stored in a points allocation profile.

* * * * *